US012438859B2

United States Patent
Shicht et al.

(10) Patent No.: US 12,438,859 B2
(45) Date of Patent: Oct. 7, 2025

(54) FLEXIBLE CRYPTOGRAPHIC ARCHITECTURE IN A NETWORK DEVICE

(71) Applicant: Mellanox Technologies, Ltd., Yokneam (IL)

(72) Inventors: Yuval Shicht, Tel Aviv (IL); Miriam Menes, Tel Aviv (IL); Ariel Shahar, Jerusalem (IL); Uria Basher, Nehusha (IL); Boris Pismenny, Haifa (IL)

(73) Assignee: Mellanox Technologies, Ltd., Yokneam (IL)

(*) Notice: Subject to any disclaimer, the term of this patent is extended or adjusted under 35 U.S.C. 154(b) by 349 days.

(21) Appl. No.: 18/195,615

(22) Filed: May 10, 2023

(65) Prior Publication Data

US 2024/0146703 A1 May 2, 2024

(51) Int. Cl.
*H04L 9/06* (2006.01)
*H04L 9/40* (2022.01)

(52) U.S. Cl.
CPC ........ *H04L 63/0485* (2013.01); *H04L 9/0618* (2013.01); *H04L 63/123* (2013.01)

(58) Field of Classification Search
CPC ................... H04L 63/0485; H04L 9/0618
See application file for complete search history.

(56) References Cited

U.S. PATENT DOCUMENTS

| | | | | |
|---|---|---|---|---|
| 7,526,085 | B1 * | 4/2009 | Bong | H04L 63/061 380/37 |
| 7,818,563 | B1 * | 10/2010 | Dwork | H04L 63/06 713/151 |
| 2002/0191790 | A1 * | 12/2002 | Anand | H04L 9/0643 380/255 |
| 2005/0198531 | A1 * | 9/2005 | Kaniz | H04L 63/164 726/5 |
| 2009/0132802 | A1 * | 5/2009 | Amann | H04L 9/0643 713/150 |
| 2013/0148802 | A1 * | 6/2013 | Taylor | H04L 9/0662 380/28 |
| 2024/0146703 | A1 * | 5/2024 | Shicht | H04L 9/0637 |
| 2024/0406154 | A1 * | 12/2024 | Menes | H04L 63/0428 |

* cited by examiner

*Primary Examiner* — Ponnoreay Pich
(74) *Attorney, Agent, or Firm* — Lowenstein Sandler LLP

(57) ABSTRACT

A network device includes a hardware pipeline to process a network packet to be encrypted. A portion of the hardware pipeline retrieves information from the network packet and generates a command based on the information. A block cipher circuit is coupled inline within the hardware pipeline. The hardware pipeline includes hardware engines coupled between the portion of the hardware pipeline and the block cipher circuit. The hardware engines parse and execute the command to determine a set of inputs and input the set of inputs and portions of the network packet to the block cipher circuit. The block cipher circuit encrypts a payload data of the network packet based on the set of inputs.

23 Claims, 7 Drawing Sheets

FLEXIBLE CRYPTOGRAPHIC ARCHITECTURE IN A NETWORK DEVICE

TECHNICAL FIELD

At least one embodiment pertains to processing resources used to perform and facilitate network communication. For example, at least one embodiment pertains to technology for flexible cryptographic architecture in a network interface device.

BACKGROUND

The ability to transfer protected and authenticated data is becoming a basic requirement of networks in use today and will become fundamental in the near future. Furthermore, the growth in cloud computing increases the demand for transferring data in a secure manner because different users access and share the same resources (e.g., cloud-based services). There are many algorithms today that define such secure networking protocols for various applications, such as secure tunneling, data streaming, internet browsing, and others. These protocols usually include a control stage (connection establishment and cryptographic handshake) and a data protection stage. The control has little resemblance among the protocols, whereas data protection has common components and specifically the cipher suite. Data protection algorithms are highly demanding in computational (or compute) resources, and repeatedly executing data protection algorithms consume extensive central processing unit (CPU) resources when performed and controlled by software, thus reducing system performance and efficiency.

BRIEF DESCRIPTION OF DRAWINGS

Various embodiments in accordance with the present disclosure will be described with reference to the drawings, in which.

DETAILED DESCRIPTION

Figure 1:
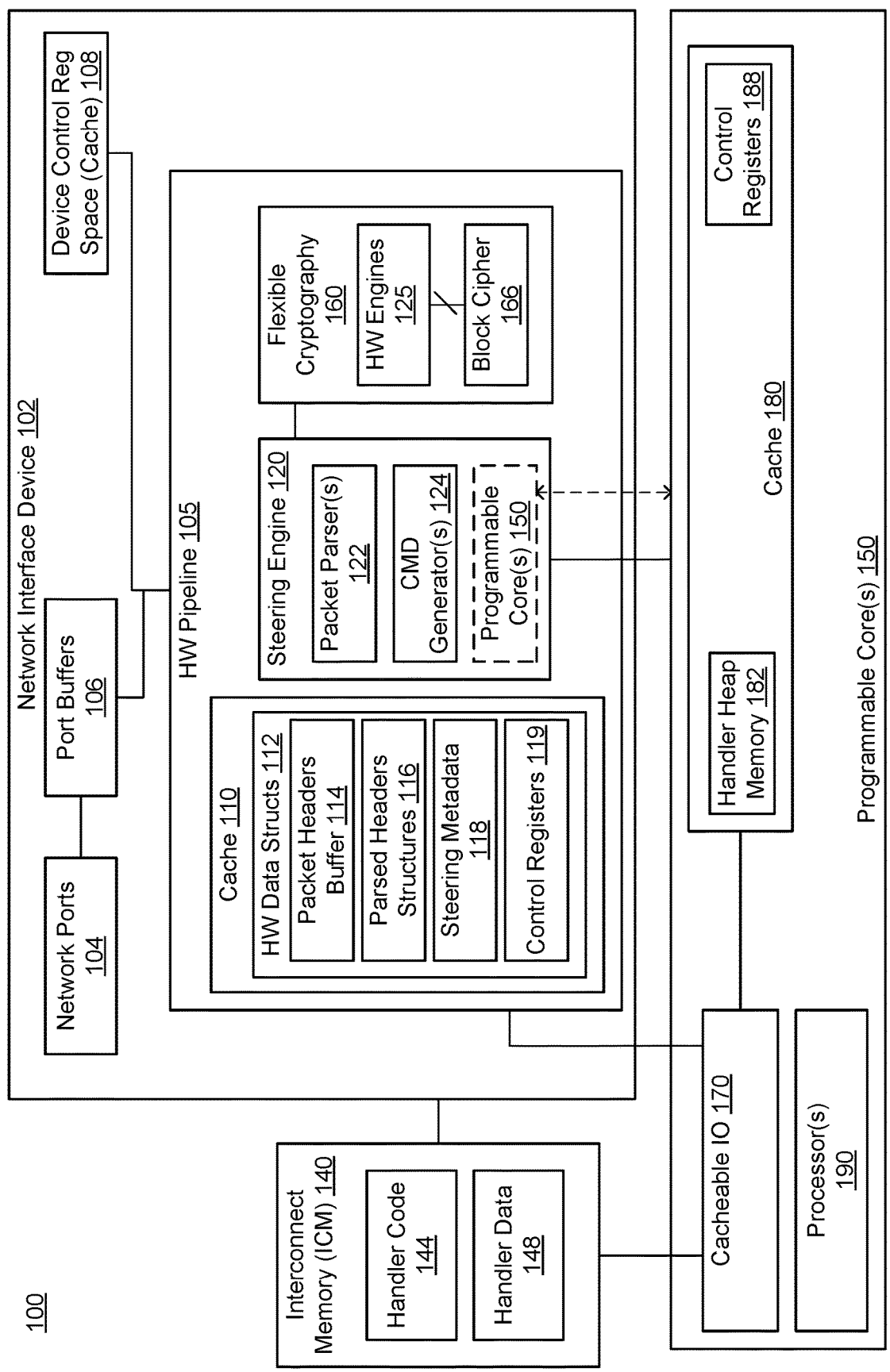
FIG. 1 is a block diagram of a network device that includes a flexible cryptographic architecture, which enables cryptographic operations performed inline within a hardware pipeline, in accordance with some embodiments.

As described above, there are disadvantages in speed and throughput of data (e.g., network packet flow) passing through a network device when relying on programmable cores or other sources of software processing to perform cryptographic algorithms and related functions of a cipher suite, including performance degradation. These disadvantages apply to secure networking protocols, particularly as the speeds and throughput of network devices increase.

Aspects and embodiments of the present disclosure address the deficiencies of relying too much on software to perform cryptographic operations by offloading algorithmic cryptographic processing and related calculations to an external resource such as a block cipher circuit that is coupled inline within a hardware pipeline, which can process network packets at up to line rate. Such block cipher circuit can be, for example, situated within a configurable stage of a networking hardware pipeline as will be explained in detail. In at least some embodiments, the hardware pipeline includes a number of hardware engines that are either only hardware or are a combination of hardware and programmable processors, such as application-specific integrated circuits (ASICs), field programmable gate arrays (FPGAs), microcontrollers, or other programmable circuits or chips. Hardware or hardware engines, e.g., that are located within a hardware pipeline of an intelligent network device, are much faster than software.

Thus, in at least some embodiments, a network device includes a hardware pipeline to process a network packet to be encrypted. A portion of the hardware pipeline retrieves information from the network packet and generates a command based on the information and which is associated with a cryptographic operation to be performed on the network packet. In embodiments, a block cipher circuit is coupled inline within the hardware pipeline, where the hardware pipeline includes a set of hardware engines coupled between the portion of the hardware pipeline and the block cipher circuit. In at least some embodiments, the set of hardware engines parses and executes the command to determine a set of inputs associated with the cryptographic operation and inputs the set of inputs and portions of the network packet to the block cipher circuit. The set of inputs may be specific to a cryptographic protocol selected from a set of cryptographic protocols. In these embodiments, the block cipher circuit encrypts (or decrypts) a payload data of the network packet based on the set of inputs. In this way, the command directs the hardware engines in providing specific inputs to the block cipher circuit to enable performing the cryptographic. In some embodiments, a programmable core that executes instructions may have some involvement in this offload flow by providing definitions or parameters that helps direct how the block cipher circuit operates.

In various embodiments, networking security protocols such as Media Access Control Security (MACsec) operates in the link layer, Internet Protocol Security (IPSec) operates in the network layer, and any number of many transport layer (or higher layer) protocols operate above MACsec and IPsec. In various embodiments, MACsec, IPSec, and these other transport layer and higher layer protocols use Advanced Encrypted Standard with Galois Counter Mode (AES-GCM) for authenticated encryption. Although the AES-GCM suite may be referenced herein by way of example, the scope of this disclosure extends to other cipher suites used within various networking security protocols.

Advantages of the present disclosure include but are not limited to improving the speed and throughput of network packets through the network device by inserting such a block cipher circuit inline with hardware engines of a hardware pipeline. For example, the block cipher circuit can be a part of a configurable, inline offload of cryptographic operations that supports any cryptographic protocol. Overall performance and efficiency of the network device are also improved by avoiding excessive interaction with software that would otherwise perform cryptographic operations. Other advantages will be apparent to those skilled in the art of intelligent network devices discussed hereinafter.

FIG. 1 is a block diagram of a network device 100 that includes a flexible cryptographic architecture of a network interface device 102, which enables cryptographic operations performed inline within a hardware pipeline, in accordance with some embodiments. In at least some embodiments, the network device 100 includes a interconnect memory (ICM) 140 coupled to one or more programmable core(s) 150 and to the network interface device 102. The ICM 140 may be understood as main memory of the network device 100, such as dynamic random access memory (DRAM) or the like. In these embodiments, the ICM 140 may store handler code 144 and handler data 148 for the functioning of an operating system (OS) and applications of the programmable core(s) 150. In some embodiments, the network device 100 is a data processing unit (DPU) alone or in combination with a switch, a router, a hub, or the like.

In various embodiments, the programmable core(s) 150 include a cacheable IO 170, cache 180, and one or more processors 190 integrated with the programmable core(s) 150, e.g., on the same die as the programmable core(s) 150. The cacheable IO 170 may be an area or region of the cache 180 dedicated to IO transactions or may be separate dedicated cache memory for the IO transactions, or a combination thereof. The cache 180 may be L1, L2, L3, other higher-level caches, or a combination thereof, associated with programmable processing of the programmable core(s) 150. The cache 180 and the cacheable IO 170 or similar region of cache may be memory-mapped to the ICM 140 in some embodiments.

In at least some embodiments, the cache 180 is fast-access memory that can include or store, for example, a handler heap memory 182 and control registers 188. For example, the cache 180 may be static random access memory (SRAM), tightly coupled memory (TCM), or other fast-access volatile memory that is mapped to the ICM 140. In some embodiments, handler heap memory 182 stores a stateful context associated with an application executed by a hardware thread of the programmable core(s) 150 to aid in processing network packets.

In some embodiments, the network interface device 102 is a network interface card (NIC). In these embodiments, the network interface device 102 includes, but is not limited to, a set of network ports 104 that are coupled to physical media of a network or the Internet, a set of port buffers 106 to receive network packets from the network ports 104, device control register space 108 (e.g., within cache or other local memory) that are coupled to the control registers 188 on the cache 180, and a hardware pipeline 105. In at least some embodiments, the hardware pipeline 105 includes a cache 110, a steering engine 120, and a flexible cryptography circuit 160. In these embodiments, at least one of the programmable core(s) 150 is located directly within the steering engine 120, e.g., a specialized core may be configured to provide supportive processing and parameters that helps direct or influence the hardware processing within the steering engine 120 and/or within the flexible cryptographic circuit 160, as will be explained.

In various embodiments, the cache 110 is configured to buffer or store hardware data structures 112 that, for example, include a packet headers buffer 114, parsed headers structures 116, steering metadata 118, and control registers 119, the latter of which store various parameters used for processing network packets. These hardware data structures 112 can be directly memory-mapped to the cacheable IO 170 and thus shareable with the programmable core(s) 150 that execute application threads that may also provide data for network packet processing performed by the HW pipeline 105.

In these embodiments, the steering engine 120 is a portion of the hardware pipeline 105 that retrieves information from the network packet and generates a command based on the information and that is associated with a cryptographic operation to be performed on the network packet. More specifically, the steering engine 120 can include packet parsers 122, each which parses network packets to retrieve headers, determine a location of and retrieve a payload of data or other parts of the network packets. The steering engine 120 can then populate the packet headers buffer 114 with packet headers, the parsed headers structures 116 with any particular structures parsed from the packet headers, and any steering metadata 118 associated with the processing of each respective network packet handled by the HW pipeline 105. In these embodiments, the flexible cryptography 160 includes (or is coupled to) a set of hardware engines 125 and also includes a block cipher circuit 166, which will be discussed.

In some embodiments, the steering engine 120 further includes command generator 124, which is configured to determine certain steering actions that are to be taken based on the information parsed from the network packets in order to process and forward any given network packet. In various embodiments, the command generator 124 includes hardware (e.g., processing device, circuitry, dedicated logic, programmable logic, microcode, hardware of a device, integrated circuit, etc.), software (e.g., instructions run or executed on a processing device), or a combination thereof. In these embodiments, the command generator 124 may execute a flow of instructions based on opcodes retrieved from headers of the network packets.

In various embodiments, the command generator 124 has access to a match-action pipeline of the steering engine 120 or which is located elsewhere in the HW pipeline 105 and/or received from the programmable cores 150. The match-action pipeline can be adapted to match information from the network packets (such as the steering metadata 118) with particular actions (e.g., via match-action criteria that may be stored in the control registers 119) that need to be taken to include encrypting/decrypting and encapsulating some packets for further transmission (although destination ports are not illustrated for simplicity). The command generator 124 can then generate specific commands based on the determined actions, which in some embodiments, includes generating a command that is intended to trigger the set of hardware engines 125 to facilitate a cryptographic operation such as authenticated encryption or decryption. In this way, the steering engine 120 is designed with flexibility in generation of the command that can be adapted for different cipher suites and different flow-specific arguments to properly trigger the correct cryptographic actions in the block cipher circuit 166 and any cryptographic post-processing.

More specifically, the set of hardware engines 125 can parse the command to determine a set of inputs associated with the cryptographic operation and input the set of inputs and portions of the network packet to the block cipher circuit 166. The block cipher circuit 166 may then encrypt or decrypt (and optionally authenticate) a payload of the network packet based on the set of inputs. Because the location of the payload of data is specific to network packets and may vary, the set of hardware engines 125 may further determine an encryption offset to a first byte of the payload data within the network packet, where the set of inputs includes the encryption offset. The set of hardware engines 125 and/or the block cipher circuit 166 may then be able to appropriately access the payload data of each network packet that is to be encrypted or decrypted by the block cipher circuit 166.

In various embodiments, the command generator(s) 124 can act as an interface to hardware and data structures that are stored in any or a combination of the device control register space 108 of the network interface device 102, control registers 188 of the programmable core(s) 150, or within the ICM 140. In some embodiments, these hardware and data structures are also accessible within the cache 110 (e.g., in the hardware data structures 112) or other memory accessible by the hardware pipeline 105. In these embodiments, the hardware engines 125 access these hardware and data structures to retrieve parameters that facilitate generating inputs to be provided to the block cipher circuit 166 that are needed to perform cryptographic operations within the block cipher circuit 166. Thus, in some embodiments, these hardware and data structures provide outputs of the set of hardware engines 125 that correspond to inputs recognizable by the block cipher 266.

As was discussed, in at least some embodiments, the hardware pipeline 105 includes a number of hardware engines (including the steering engine 120 and the set of hardware engines 125) that are either only hardware or are a combination of hardware and programmable processors, such as ASICs, FPGAs, microcontrollers, or other programmable circuits or chips. At least some of the hardware engines of the hardware pipeline 105 may execute firmware as part of the hardware execution of processing network packets. Accordingly, the use of the term "hardware" should not be understood to mean only discrete gates and logic, for example, and can include other hardware computing and programmed modules, processors, or circuits.

Figure 2:
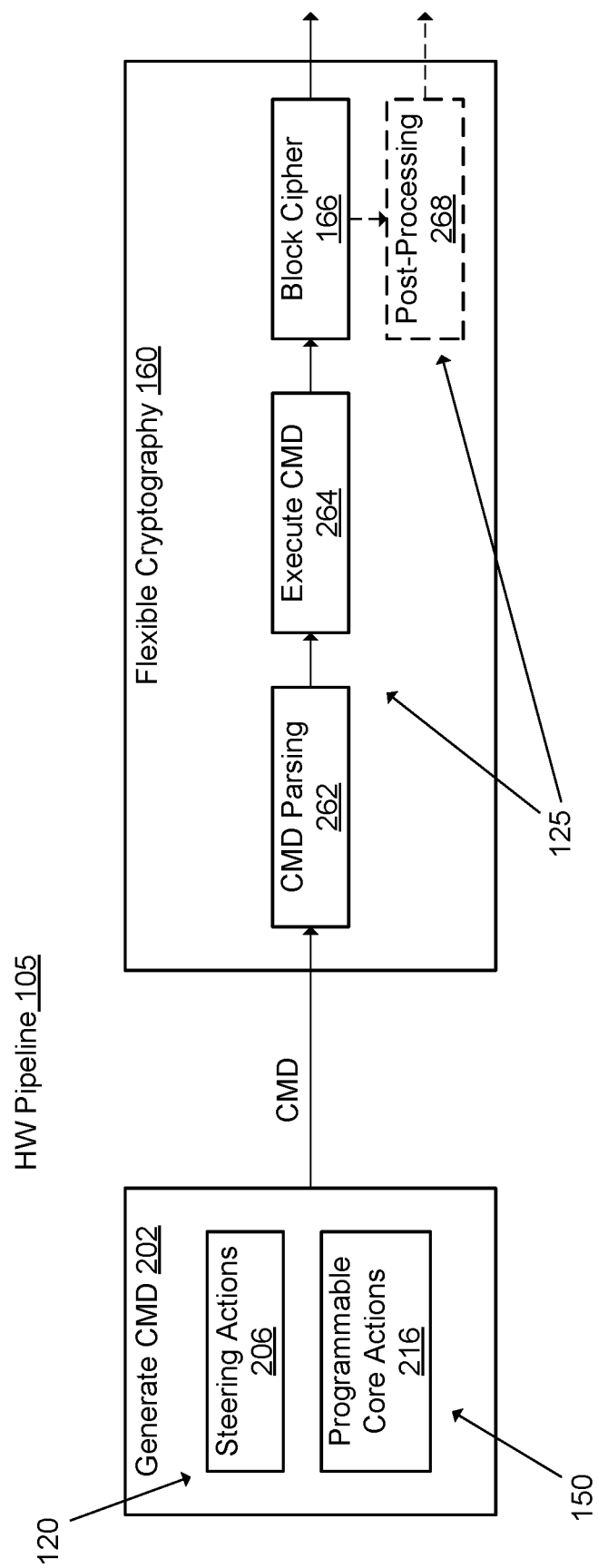
FIG. 2 is a simplified diagram of the hardware pipeline of FIG. 1 that employs flexible cryptographic operations, in accordance with some embodiments.

FIG. 2 is a simplified diagram of the hardware pipeline 105 of FIG. 1 that employs flexible cryptographic operations, in accordance with some embodiments. In some embodiments, the hardware pipeline 105 generates a command 202 via steering actions 206 and optionally also that are generated via programmable core actions 216. In embodiments, the steering engine 120 performs the steering actions 206, and the programmable cores 150 perform the programmable core actions 216. In this way, the network interface device 102 can optionally combine operations with the programmable cores 150 to generate the command that was discussed with reference to FIG. 1.

In various embodiments, the flexible cryptography circuit 160 may then dynamically determine, based on the command, what inputs are to be sent to the block cipher circuit 166. In these embodiments, the set of hardware engines 125 may generally be classified into command parsing engines 262, execute command engines 264, and optional post-processing engines 268. (Optional operations are illustrated in dashed lines in the present figures.) The command parsing engines 262 may be specially adapted to parse the command received from the combination of the steering engine 120 and the programmable cores 150, e.g., to determine actions to be performed by the execute command engines 264 and the optional post-processing engines 268, including whether and how headers are to be protected and/or encrypted or decrypted, among other actions that will be discussed.

In these embodiments, the execute command engines 264 can then perform such actions to generate the set of inputs associated with and intended to trigger the cryptographic operation. The execute command engines 264 may be adapted to optionally interact with the control registers that store the previously referenced hardware and data structures, retrieve pointers to encryption or decryption keys usable by the block cipher circuit 166, generate initialization vector (IV), nonce, or other special crypto strings (e.g., for varying security protocols) for the block cipher circuit 166, retrieve additional authenticated data (AAD) useable by the block cipher circuit 166, among others. In some embodiments, the optional post-processing engines 268 can perform additional security-related operations after the payload of the network packet is encrypted or decrypted, such as encrypting a header, overwriting a trailer of the network packet to include an integrity check value, or removing the trailer. These various hardware engines will be discussed in more detail with reference to FIGS. 4-7. In this way, by positioning the flexible cryptography circuit 160, to include the block cipher circuit 166, coupled inline with other hardware engines of the hardware pipeline 105, the cryptographic operations performed on network packets as part of the packet processing may be performed at up to line rate and much faster than software execution of such cryptographic operations.

Figure 3:
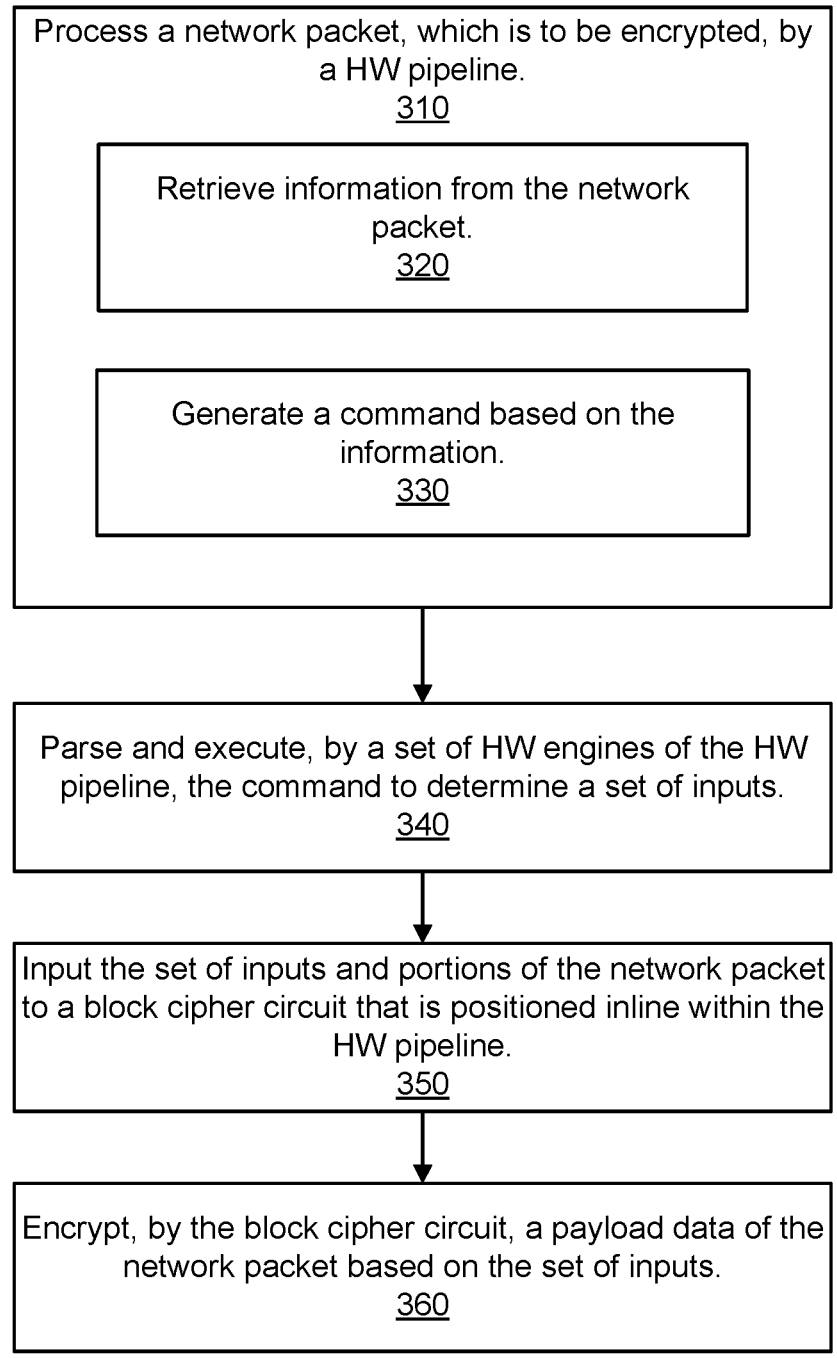
FIG. 3 is a flow diagram of a method for flexibly processing a network packet and generating inputs into a block cipher positioned inline within a hardware pipeline, in accordance with some embodiments.

FIG. 3 is a flow diagram of a method 300 for flexibly processing a network packet and generating inputs into a block cipher positioned inline (e.g., coupled inline) within a hardware pipeline, in accordance with some embodiments. In various embodiments, the method 300 is performed by the network interface device 102 and particularly by the hardware pipeline 105 of the network interface device 102.

At operation 310, the hardware pipeline 105 processes a network packet, which is to be encrypted.

At operation 320, which can be a subset of operation 310, the hardware pipeline 105 retrieves information from the network packet. The information may, for example, inform as to what type of cipher suite or cryptographic operation (e.g., authenticated encryption) is to be carried out on the network packet.

At operation 330, which can be a subset of operation 310, the hardware pipeline generates a command based on the information. In some embodiments, the command is associated with a cryptographic operation to be performed on the network packet.

At operation 340, the hardware pipeline 105 (e.g., the set of hardware engines 125) parses and executes the command to determine a set of inputs. In some embodiments, the set of inputs is associated with the cryptographic operation.

At operation 350, the hardware pipeline 105 inputs the set of inputs and portions of the network packet to the block cipher circuit 166 that is positioned inline within the hardware pipeline 105.

At operation 360, the hardware pipeline 105 (e.g., the block cipher circuit 166) encrypts a payload data of the network packet based on the set of inputs. In some embodiments the encryption performed includes authentication. A similar set of operations may be performed for decryption of network packets that include an encrypted payload of data (and optionally an encrypted header), as will be apparent with reference to FIGS. 6-7.

Figure 4:
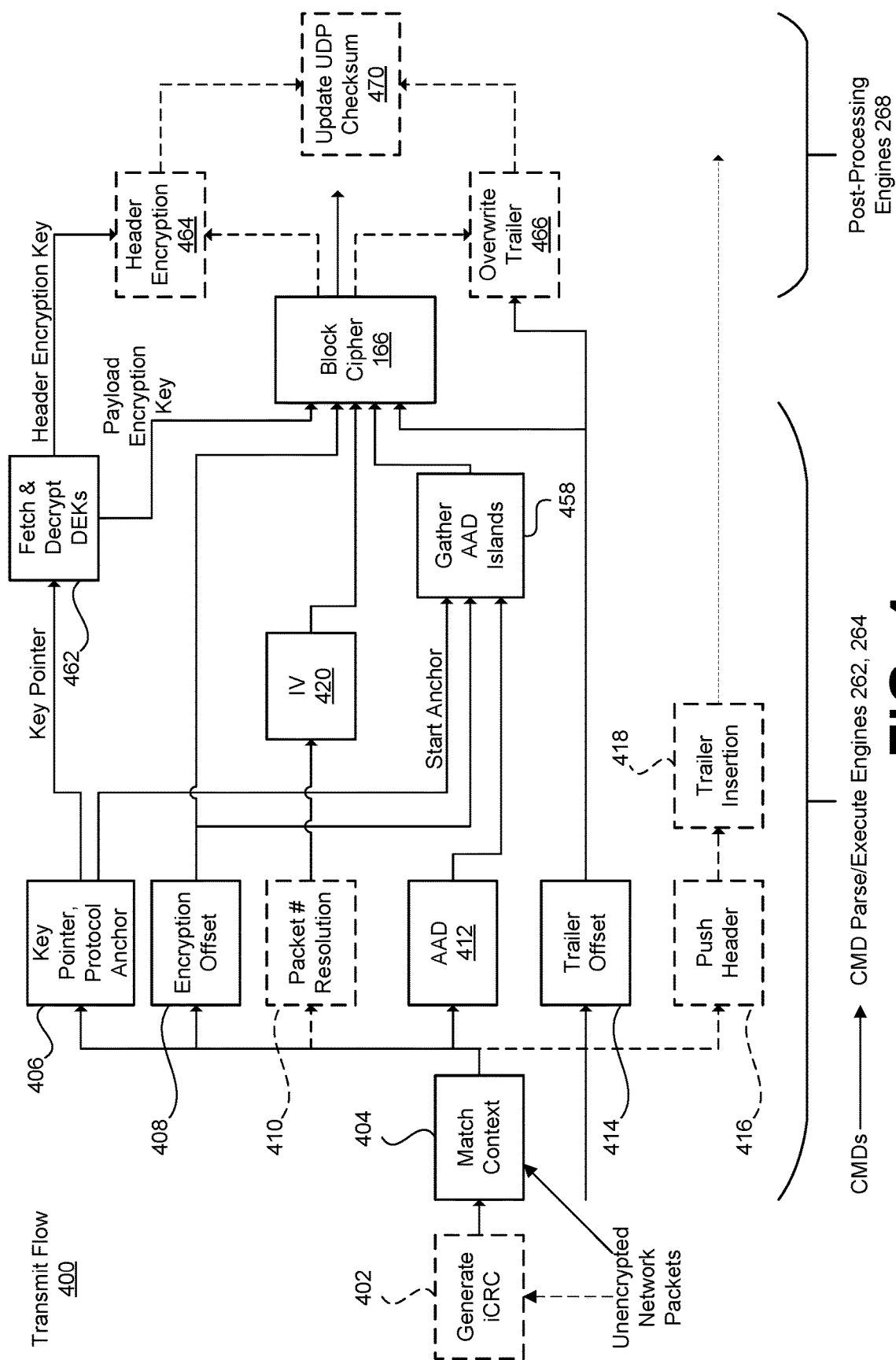
FIG. 4 is a modified flow and architectural diagram illustrating a packet transmit flow of a flexible cryptographic architecture, in accordance with some embodiments.
Figure 5:
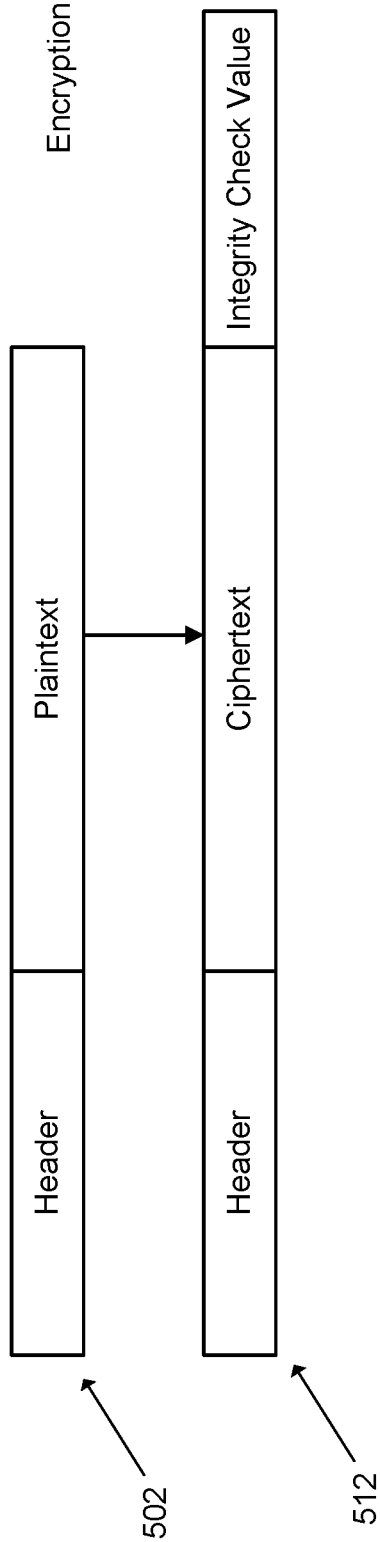
FIG. 5 is a simplified diagram of a network packet that undergoes encryption, in accordance with some embodiments.

FIG. 4 is a modified flow and architectural diagram illustrating a packet transmit flow 400 of a flexible cryptographic architecture, in accordance with some embodiments. FIG. 5 is a simplified diagram of a network packet that undergoes encryption, in accordance with some embodiments. In these embodiments, the transmit flow 400 optionally includes performing, at operation 402, an invariant cyclic redundancy check (iCRC), e.g., executing an error-detecting code used in digital networks and storage devices to detect accidental changes to digital data. Blocks of packet data entering the transmit flow 400 may get a short check value attached based on a remainder of a polynomial divisional of its contents.

In various embodiments, the hardware pipeline 105 includes the set of hardware engines 125 coupled between the portion of the hardware pipeline 105 (e.g., the steering engine 120) and the block cipher circuit 166 (see FIG. 1). In embodiments, this portion of the hardware pipeline 105 may include the command parse engines 262 and the execute command engines 264 discussed with reference to FIG. 2. Specifically, the command parse engines 262 and the execute command engines 264 may parse and execute the command received from the generate command operation 202 of FIG. 2 to determine a set of inputs associated with the cryptographic operation and input the set of inputs and portions of the network packet to the block cipher circuit 166 and to any relevant of the optional post-processing engines 268. In these embodiments, the block cipher circuit 166 encrypts the payload data of the network packet based on or using this set of inputs. How the encryption is performed may be specific to the cipher suite that the block cipher circuit 166 employs.

At operation 404, the portion of the hardware pipeline 105 parses the command and performs a match of context of the network packet in order to identify certain information within the network packet that the parsed command indicates is to be used in determining the set of inputs. The hardware engine(s) performing this match context may involve instantiation of an interface that has generative abilities, such as copy, paste, store, and the like, in order to pass on information and data to further hardware engines that will execute the command on this information and data. Part of matching the context may include determining, from parsing the command, whether the flexible cryptography circuit 160 is to encrypt the payload and/or the header of the network packet.

By way of example, at operation 406, a HW engine may access a key pointer to an algorithm or wrapping logic specific to a protection or cryptographic protocol. As mentioned, although the cryptographic suite protocol used extensively by way of example is AES-GCM (in being a combination of other protocols), other protocols individually or combined in a different way may also be employed. The HW engine may also access some per-packet context and/or protocol anchor information. The protocol anchor information may include a start anchor in the packet where additional authenticated data (AAD) islands should start. The key pointer and start anchor information may be passed forward for use by additional operational blocks.

For example, at operation 462, a HW engine may use the key pointer to retrieve and decrypt data encryption key(s) (DEKs) to be used by the flexible cryptography circuit 160. For example, the HW engine may retrieve a payload encryption key and header encryption key from a register (or other location) to which the key pointer points. The HW engine may further send the payload encryption key to the block cipher circuit 166 for use in encryption of the payload data and the header encryption key to a post-processing engine 268 that performs header encryption at operation 464.

In these embodiments, the header encryption performed at operation 464 may be optional, but if performed, it provides an additional level of protection for the packet header, and thus provide integrity for the network packet as a whole. For example, encrypting the packet header can help prevent middleboxes attacks and vulnerabilities from interfering with delivery of a particular packet to an intended destination. Thus, while the block cipher circuit 166 encrypts the payload data of the network packet, a separate crypto block (e.g., the post-processing engine 268) may perform the header encryption illustrated at operation 464 so that both the payload data and the header can be encrypted in parallel or sequentially and by different keys in at least one embodiment.

At operation 408, a HW engine determines an encryption offset to a first byte of the payload data within the network packet, where the set of inputs includes the encryption offset. FIG. 5 illustrates an example unencrypted network packet 502 that includes a header and a plaintext payload of data. Thus, the HW engine may determine the offset to the first byte of the payload, which is for encryption. Normally, software would not have header appended before the data is encrypted, so the flexible cryptography circuit 160 needs the encryption offset so hardware knows where to find the data on which it will perform the encryption. The encryption offset may be determined using a combination of values (which could be a linear combination in one embodiment) from the packet (usually length fields).

At operation 410, a HW engine optionally resolves a packet number or identifier that, in AES-GCM, may be used to construct the initialization vector (IV) and nonce, at operation 420, which is included in the set of inputs. This IV and nonce may be an arbitrary or random number used along with the payload encryption key that is used once per session. The IV and nonce may be constructed with packet or sequence number, a salt value (random number), XOR operation, and/or values from the packet header.

At operation 412, a HW engine may determine additional authenticated data (AAD), which is included in the set of inputs, as a concatenated stream of bytes selected from at least one of a header of the network packet, a security context, and a set of most-significant bits of the sequence number of the network packet. If using the set of most-significant bits, the start anchor value may inform the HW engine where those MSB start. The AAD used and whether AAD is used may differ with different cryptographic suite protocols. In some embodiments, the packet header is used as AAD to make sure no one tampered with the packet header. The AAD may be constructed using several slices of streams of bytes, each with an offset and length, from different sources (packet, context, etc.). The streams are concatenated to a single stream of bytes that is one of the inputs provided to the block cipher circuit 166.

At operation 414, a HW engine may determine a trailer offset, according to a length of the payload data, to a trailer location of the network packet where an integrity check value is to be located. Thus, the set of inputs to the block cipher circuit 166 may include the trailer offset. As illustrated in FIG. 5, an encrypted network packet 512 may include the header, the Ciphertext, and the integrity check value, which in AES-GCM, is referred to as an authentication tag. In these embodiments, the block cipher circuit 166 further generates the integrity check value to authenticate the payload data and appends the integrity check value to the network offset according to the trailer offset.

As software is removed from the cryptographic operations, operation 414 facilitates ensuring that the block cipher circuit 166 properly locates the integrity check value at the correct location within the encrypted network packet. In some embodiments, the HW engine, at operation 414, may further add or remove additional bytes of data to or from an end of the payload data to provide space for the integrity check value at the correct location. In these embodiments, the hardware pipeline 105 further includes a post-processing hardware engine 268 to optionally, at operation 466, overwrite a trailer of the network packet with the integrity check value. The integrity check value, however, may still be provided by the block cipher circuit 166 to the post-processing hardware engine 268.

In some embodiments, the cryptographic operations are performed in "unaware mode" meaning that the operations to be performed on data the user did not define that is to be encrypted or decrypted. In these embodiments, one or more HW engines, at operation 416, push a header and at operation 418, insert a trailer. Pushing the header at operation 416 involves inserting a header that was non-existent to begin with (e.g., generated by the steering engine 120), and inserting the trailer at operation 418 involves inserting a trailer that was non-existent to begin with (e.g., generated by the steering engine 120). As for the trailer, the insertion at operation 418 could be of placeholder bytes for other purposes, and which ensures that the integrity check value is properly positioned at a particular offset from the added bytes.

At operation 470, a post-processing engine 268 may optionally perform a User Datagram Protocol (UDP) checksum, an error detection mechanism to determine the integrity of the data transmitted over a network. Communication protocols like TCP/IP/UDP implement this scheme in order to determine whether the received data is corrupted along the network.

Figure 6:
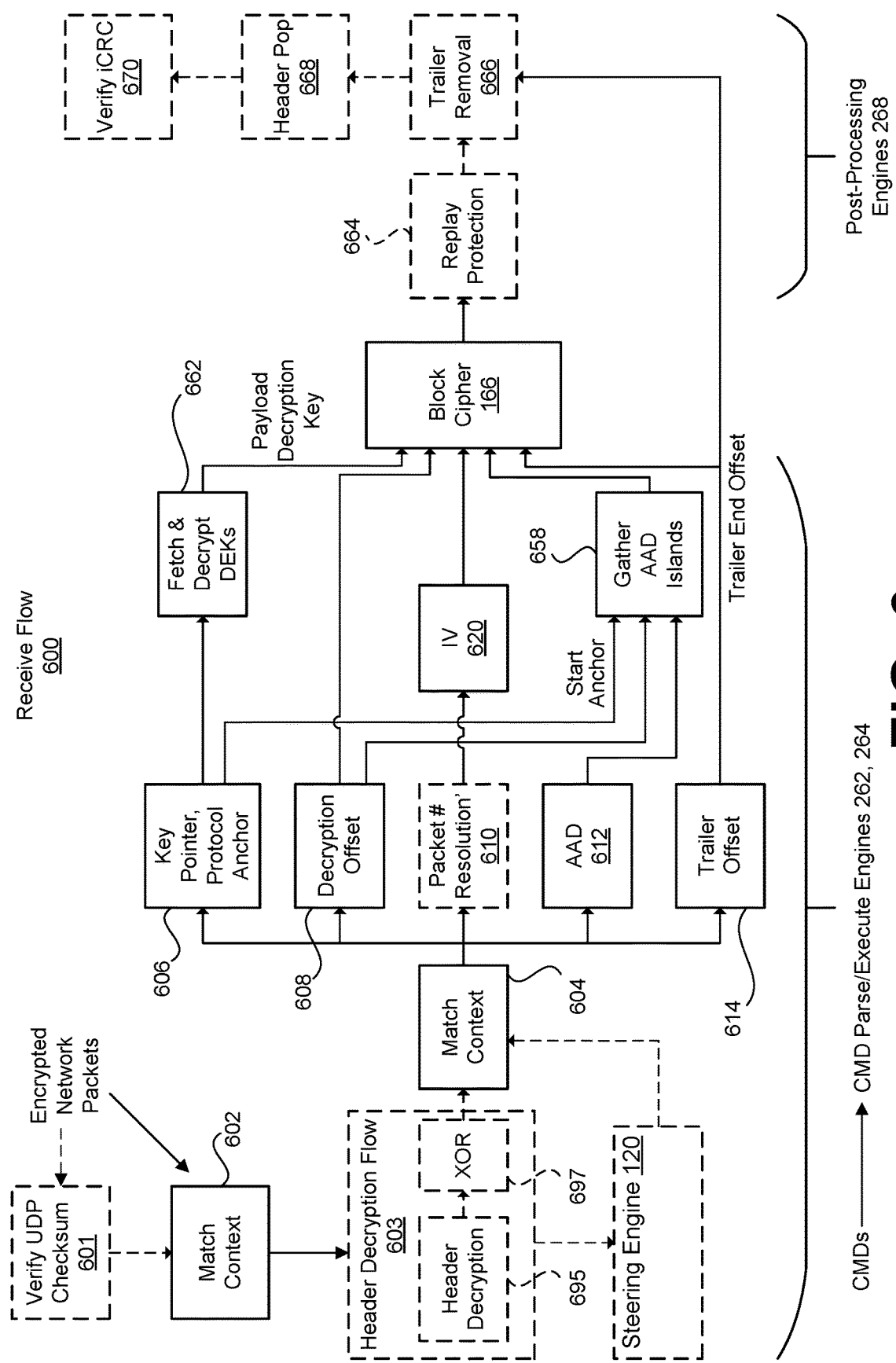
FIG. 6 is a modified flow and architectural diagram illustrating a packet receive flow of a flexible cryptographic architecture, in accordance with some embodiments.
Figure 7:
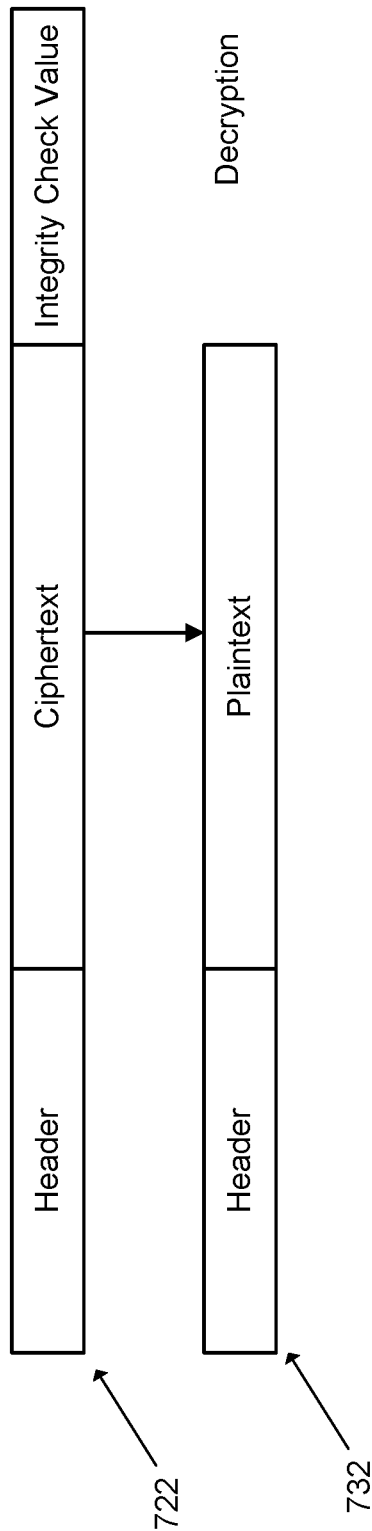
FIG. 7 is a simplified diagram of a network packet that t ndergoes decryption, in accordance with some embodiments.

FIG. 6 is a modified flow and architectural diagram illustrating a packet receive flow 600 of a flexible cryptographic architecture, in accordance with some embodiments. FIG. 7 is a simplified diagram of a network packet that undergoes decryption, in accordance with some embodiments. In embodiments, the receive flow 600 correlates roughly to a reverse set of the operations performed in the transmit flow 400 discussed with reference to FIG. 4, employed to decrypt encrypted network packets. In various embodiments, the hardware pipeline 105 includes the set of hardware engines 125 to process a network packet that is encrypted. For example, the receive flow 600 optionally includes a HW engine performing, at operation 601, a verify of a UDP checksum similar to what was discussed with reference to operation 470 of FIG. 4.

In these embodiments, the receive flow 600 further includes a HW engine performing, at operation 602, at least an initial match context with at least particular bytes within the header of the network packet. For example, at operation 602, the HW engine may retrieve a header decryption key, decrypt these particular bytes, and perform a match-action flow on the decrypted bytes to determine a context for whether the rest of the header is encrypted, and if so, with which cipher suite. This will inform the direction of the decryption flow for the receive flow 600 of FIG. 6, including whether to decrypt the header and what parameters to retrieve to do so.

In some embodiments, the hardware pipeline 105 can include a first portion to optionally, at operation 603, decrypt a header of the network packet (if the header is encrypted, as determined at operation 602), such as by one or more of the command execute engines 264. In embodiments, the operation 603 is performed as two sub-operations, including a header decryption 695 operation to decrypt the packet header with a header decryption key and an XOR operation 697 that operates on the header data to be used later in the receive flow 600. In some embodiments, the header decryption 695 is performed by running a cryptographic operation, and then perform XOR's between the header and outputs of the cryptographic operation. The result is a decrypted header. In some embodiments, the header decryption 695 is performed in the programmable core 150.

The hardware pipeline 105 can further include a second portion to retrieve information from the decrypted header and generate a command based on the information and associated with a cryptographic operation to be performed on the network packet. For example, this second portion of the hardware pipeline 105 can include the steering engine 120, which further includes the packet parser 122 and the command generator 124 (FIG. 2).

In these embodiments, the hardware pipeline 105 further includes the set of hardware engines 125 (e.g., command parse engines 262 and execute command engines 263) coupled between the second portion and the block cipher circuit 166 to parse and execute the command to determine a set of inputs associated with the cryptographic operation and input the set of inputs and portions of the network packet to the block cipher circuit 166 and to any relevant post-processing engines 268. In these embodiments, the block cipher circuit 166 then decrypts a payload data of the network packet based on the set of inputs. How the decryption is performed may be specific to the cipher suite that the block cipher circuit 166 employs.

At operation 604, one or more command parse engines 262 of the hardware pipeline 105 parses a command and performs a match of context of the encrypted network packet in order to identify certain information within the network packet that the parsed command indicates is to be used in determining a set of inputs into the block cipher circuit 166. Thus, while some matching and parsing is performed at operation 602 before decrypting the header, additional matching may be performed after the header is decrypted. The hardware engine(s) performing this match context may involve instantiation of an interface that has generative abilities, such as copy, paste, store, and the like, in order to pass on information and data to further hardware engines that will execute the command on this information and data. Part of matching the context may include determining, from parsing the command, whether the flexible cryptography circuit 160 is to decrypt the payload and/or the header of the network packet.

By way of example, at operation 606, a HW engine may access a key pointer to an algorithm or wrapping logic specific to a protection or cryptographic protocol. As mentioned, although the cryptographic suite protocol used extensively by way of example is AES-GCM (in being a combination of other protocols), other protocols individually or combined in a different way may also be employed. The HW engine may also access some per-packet context and/or protocol anchor information. The protocol anchor information may include a start anchor in the packet where additional authenticated data (AAD) islands should start. The key pointer and start anchor information may be passed forward for use by additional operational blocks.

For example, at operation 662, a HW engine may use the key pointer to fetch and decrypt data encryption key(s) (DEKs) to be used by the flexible cryptography circuit 160. In an embodiment, the HW engine generates a payload decryption key that is sent to the block cipher circuit 166 for use in decryption of the payload data.

At operation 608, a HW engine determines a decryption offset to a first byte of the payload data within the network packet, where the set of inputs includes the decryption offset. FIG. 7 illustrates an example encrypted network packet 712 that includes a header, a ciphertext payload of data, and an integrity check value. In AES-GCM, the integrity check value is known as an authentication tag. Thus, the HW engine may determine the offset to the first byte of the payload, which is for decryption. In embodiments, the flexible cryptography circuit 160 needs the decryption offset so hardware knows where to find the data on which it will perform the decryption. The decryption offset may be determined using a combination of values (which could be a linear combination in one embodiment) from the packet (usually length fields).

At operation 610, a HW engine optionally resolves a packet number or identifier that, in AES-GCM, may be used to construct the initialization vector (IV) and nonce, at operation 620, which is included in the set of inputs. This IV and nonce may be an arbitrary or random number used along with the payload key that is used once per session. The IV and nonce may be constructed with packet or sequence number, salt (random number), XOR operation, and/or values from the packet header.

At operation 612, a HW engine may determine additional authenticated data (AAD), which is included in the set of inputs, as a concatenated stream of bytes selected from at least one of a header of the network packet, a security context, and a set of most-significant bits of the sequence number of the network packet. If using the set of most-significant bits, the start anchor value may inform the HW engine where those MSB start. The AAD used and whether AAD is used may differ with different cryptographic suite protocols. In some embodiments, the packet header is used as AAD to make sure no one tampered with the packet header. The AAD may be constructed using several slices of streams of bytes, each with an offset and length, from different sources (packet, context, etc.). The streams are concatenated to a single stream of bytes that is one of the inputs provided to the block cipher circuit 166.

At operation 614, a HW engine may determine a trailer offset, according to a length of the payload data, to a trailer location of the network packet where an integrity check value is located. Thus, the set of inputs to the block cipher circuit 166 may include the trailer offset and may also be forwarded to a post-processing engine 268 that performs operation 666.

As illustrated in FIG. 7, once the block cipher circuit 166 has decrypted the payload data, the Ciphertext in the encrypted network packet 722 is replaced with plaintext generated by the decryption, generating an unencrypted network packet 732. Additional post-processing may also be performed on the encrypted network packet 722 to further ensure integrity of the payload data and with reference to the integrity check value in the trailer.

In various embodiments, the block cipher circuit 166 further retrieves, using the trailer offset determined at operation 614, the integrity check value and authenticates the payload data based on the integrity check value. At operation 664, a post-processing engine 268 can optionally perform additional protection mechanisms including replay protection. Replay protection, for example, ensures the network packet is not further processed if replayed by a third party, e.g., to avoid a man in the middle scenario or other security risks while transmitting.

At operation 666, the post-processing engine 268 may further remove the trailer, e.g., the integrity check value that is no longer required. Thus, what results is the decrypted network packet 732 (FIG. 7). For example, the post-processing engine 268 may be a trailer removal engine coupled to the block cipher circuit 166 and configured to remove a trailer of the decrypted network packet that contained the integrity check value, and optionally also that includes additional bytes of data that was added to align the integrity check value to a particular location at the end of the payload data. In some embodiments, the trailer removal of operation 666 may also be intended to remove a trailer that was added at operation 418 of the transmit flow 400 (FIG. 4).

At operation 668, the post-processing engine 268 may pop (or remove) the packet header if the packet header was added at operation 416 of the transmit flow 400 (FIG. 4). At operation 670, an invariant cyclic redundancy check (iCRC), e.g., executing an error-detecting code used in digital networks and storage devices to detect accidental changes to digital data, e.g. of the payload data. Blocks of packet data leaving the receive flow 600 may be CRC-verified based on a short check value that had been attached at operation 402 of the transmit flow 400 based on a remainder of a polynomial divisional of its contents.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device, a NIC, or an accelerator. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A network device comprising:
 a hardware pipeline to process a network packet to be encrypted, wherein a portion of the hardware pipeline is to retrieve information from the network packet and generate a command based on the information;
 a block cipher circuit coupled inline within the hardware pipeline; and
 wherein the hardware pipeline comprises a set of hardware engines coupled between the portion of the hardware pipeline and the block cipher circuit, the set of hardware engines to:
  parse and execute the command to determine a set of inputs; and
  input the set of inputs and portions of the network packet to the block cipher circuit; and
 wherein the block cipher circuit is to encrypt a payload data of the network packet based on the set of inputs.

2. The network device of claim 1, wherein the set of hardware engines is further to determine an encryption offset to a first byte of the payload data within the network packet, and wherein the set of inputs includes the encryption offset.

3. The network device of claim 2, wherein the set of hardware engines is to determine the encryption offset from a combination of length fields from the network packet.

4. The network device of claim 1, further comprising an interface coupled to the hardware pipeline and to the set of hardware engines, wherein, to determine the set of inputs, the set of hardware engines is to access the interface based on strings of the command.

5. The network device of claim 1, wherein the set of hardware engines is further to:
 determine a trailer offset, according to a length of the payload data, to a trailer location of the network packet where an integrity check value is to be located, wherein the set of inputs includes the trailer offset; and
 wherein the block cipher circuit is further to:
  generate the integrity check value to authenticate the payload data; and
  append the integrity check value to the network offset according to the trailer offset.

6. The network device of claim 5, wherein the set of hardware engines is further to one of add or remove additional bytes of data to or from an end of the payload data to provide space for the integrity check value, wherein the hardware pipeline further comprises a post-processing hardware engine to overwrite a trailer of the network packet with the integrity check value.

7. The network device of claim 1, wherein the set of hardware engines is further to access a pointer to a register from which to retrieve a payload encryption key, the set of inputs includes the pointer, and wherein the block cipher circuit is to encrypt the payload data using the payload encryption key.

8. The network device of claim 1, wherein the set of hardware engines is further to determine a pointer to a register from which to retrieve a header encryption key, wherein the hardware pipeline further comprises a post-processing hardware engine to encrypt a header of the network packet using the header encryption key, wherein the encrypted header is to provide integrity for the network packet as a whole.

9. The network device of claim 1, wherein the set of hardware engines is further to:
 construct an initialization vector, which is included in the set of inputs, from a combination of a sequence number of the packet, a salt value, and inputs from a header of the network packet; and
 determine additional authenticated data, which is included in the set of inputs, as a concatenated stream of bytes selected from at least one of a header of the network packet, a security context, and a set of most-significant bits of the sequence number of the network packet.

10. The network device of claim 1, wherein the set of inputs are specific to a cryptographic protocol selected from a set of cryptographic protocols.

11. The network device of claim 1, further comprising a programmable core integrated with the hardware pipeline, wherein a portion of the command is generated based on processing performed by the programmable core.

12. A network device comprising:
 a hardware pipeline to process a network packet that is encrypted, wherein the hardware pipeline comprises:
  a first portion to decrypt a header of the network packet; and
  a second portion to retrieve information from the decrypted header and generate a command based on the information;
 a block cipher circuit coupled inline within the hardware pipeline; and
 wherein the hardware pipeline comprises a set of hardware engines coupled between the second portion and the block cipher circuit, the set of hardware engines to:
  parse and execute the command to determine a set of inputs; and
  input the set of inputs and portions of the network packet to the block cipher circuit; and
 wherein the block cipher circuit is to decrypt a payload data of the network packet based on the set of inputs.

13. The network device of claim 12, wherein the set of hardware engines is further to determine a decryption offset to a first byte of the payload data within the network packet, and wherein the set of inputs includes the decryption offset.

14. The network device of claim 13, wherein the set of hardware engines is to determine the decryption offset from a combination of length fields from the network packet.

15. The network device of claim 12, further comprising an interface coupled to the hardware pipeline and to the set of hardware engines, wherein, to determine the set of inputs, the set of hardware engines is to access the interface based on strings of the command.

16. The network device of claim 12, wherein the set of hardware engines is further to:
 determine a trailer offset, according to a length of the payload data, to a trailer location of the network packet where an integrity check value is located, wherein the set of inputs includes the trailer offset; and
 wherein the block cipher circuit is further to:
  retrieve, using the trailer offset, the integrity check value; and
  authenticate the payload data based on the integrity check value.

17. The network device of claim 16, further comprising a trailer removal engine coupled to the block cipher circuit, the trailer removal engine to remove a trailer of the network packet that contained the integrity check value.

18. The network device of claim 12, wherein the set of hardware engines is further to determine a pointer to a register from which to retrieve a payload decryption key, the set of inputs includes the pointer, and wherein the block cipher circuit is to decrypt the payload data using the payload decryption key.

19. The network device of claim 12, wherein the set of hardware engines is further to:
construct an initialization vector, which is included in the set of inputs, from a combination of a sequence number of the packet, a salt value, and inputs from a header of the network packet; and
determine additional authenticated data, which is included in the set of inputs, as a concatenated stream of bytes selected from at least one of a header of the network packet, a security context, and a set of most-significant bits of the sequence number of the network packet.

20. The network device of claim 12, further comprising a programmable core integrated with the hardware pipeline, wherein a portion of the command is generated based on processing performed by the programmable core.

21. The network device of claim 12, wherein the set of inputs are specific to a cryptographic protocol selected from a set of cryptographic protocols.

22. A method comprising:
processing a network packet, which is to be encrypted, by a hardware pipeline, wherein processing comprises:
retrieving information from the network packet; and
generating a command based on the information;
parsing, by a set of hardware engines of the hardware pipeline, the command to determine a set of inputs;
inputting the set of inputs and portions of the network packet to a block cipher circuit that is positioned inline within the hardware pipeline; and
encrypting, by the block cipher circuit, a payload data of the network packet based on the set of inputs.

23. The method of claim 22, further comprising determining an encryption offset to a first byte of the payload data within the network packet, wherein the set of inputs includes the encryption offset.

* * * * *